US011589085B2

(12) United States Patent
Turgut et al.

(10) Patent No.: US 11,589,085 B2
(45) Date of Patent: *Feb. 21, 2023

(54) METHOD AND APPARATUS FOR A VIRTUAL ONLINE VIDEO CHANNEL

(71) Applicant: Google LLC, Mountain View, CA (US)

(72) Inventors: Alper Turgut, San Francisco, CA (US); Oztan Harmanci, Mountain View, CA (US); Ismail R. Haritaoglu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,481

(22) Filed: Mar. 16, 2020

(65) Prior Publication Data

US 2020/0221145 A1 Jul. 9, 2020

Related U.S. Application Data

(63) Continuation of application No. 15/590,996, filed on May 9, 2017, now Pat. No. 10,595,054.
(Continued)

(51) Int. Cl.
*H04N 21/2665* (2011.01)
*H04N 21/234* (2011.01)
(Continued)

(52) U.S. Cl.
CPC ... *H04N 21/23424* (2013.01); *H04L 65/1069* (2013.01); *H04L 65/70* (2022.05);
(Continued)

(58) Field of Classification Search
CPC ......... H04N 21/23424; H04N 21/2187; H04N 21/262; H04N 21/2665; H04N 21/2668;
(Continued)

(56) References Cited

U.S. PATENT DOCUMENTS 5,442,744 A 8/1995 Piech et al.
5,513,260 A 4/1996 Ryan
(Continued)

FOREIGN PATENT DOCUMENTS

CN 101325687 A 12/2008
CN 101356820 A 1/2009
(Continued)

OTHER PUBLICATIONS

D. G. Lowe, "Object Recognition from Local Scale-Invariant Features", in International Conference on Computer Vision, vol. 2, 1999, pp. 1-8.
(Continued)

*Primary Examiner* — John R Schnurr
(74) *Attorney, Agent, or Firm* — Lowenstein Sandler LLP

(57) ABSTRACT

An apparatus and method for providing a virtual online live video channel are disclosed. In one implementation, a processing device may receive a request to play the virtual online linear video channel from a video player. The processing device may establish a connection between a manifest server and the video player. The processing device may further identify a schedule for the virtual online linear video channel, the schedule identifies a plurality of video sources. The processing device may then provide, using the connection, a manifest file to the video player, the manifest file corresponding to the schedule for the virtual online linear video channel and identifying a first location of a live video stream and a second location of a prerecorded video signal, the live video stream and the prerecorded video signal to be retrieved by the video player and presented to a user of the video player.

20 Claims, 5 Drawing Sheets

Related U.S. Application Data

(60) Provisional application No. 62/334,236, filed on May 10, 2016.

(51) Int. Cl.

| | | |
|---|---|---|
| *H04N 21/262* | (2011.01) | |
| *H04N 21/2668* | (2011.01) | |
| *H04N 21/84* | (2011.01) | |
| *H04N 21/6332* | (2011.01) | |
| *H04L 65/70* | (2022.01) | |
| *H04L 65/1069* | (2022.01) | |
| *H04N 21/2187* | (2011.01) | |
| *H04N 21/482* | (2011.01) | |
| *H04N 21/81* | (2011.01) | |

(52) U.S. Cl.
CPC ....... *H04N 21/2187* (2013.01); *H04N 21/262* (2013.01); *H04N 21/2665* (2013.01); *H04N 21/2668* (2013.01); *H04N 21/482* (2013.01); *H04N 21/6332* (2013.01); *H04N 21/812* (2013.01); *H04N 21/84* (2013.01)

(58) Field of Classification Search
CPC ............. H04N 21/482; H04N 21/6332; H04N 21/812; H04N 21/84; H04L 65/1069; H04L 65/607
See application file for complete search history.

(56) References Cited

U.S. PATENT DOCUMENTS

| | | |
|---|---|---|
| 5,577,135 A | 11/1996 | Grajski et al. |
| 5,659,613 A | 8/1997 | Copeland et al. |
| 5,668,603 A | 9/1997 | Copeland |
| 5,721,788 A | 2/1998 | Powell et al. |
| 5,883,959 A | 3/1999 | Kori |
| 5,917,943 A | 6/1999 | Washizawa |
| 6,018,374 A | 1/2000 | Wrobleski |
| 6,026,189 A | 2/2000 | Greenspan |
| 6,173,275 B1 | 1/2001 | Caid et al. |
| 6,373,960 B1 | 4/2002 | Conover et al. |
| 6,381,367 B1 | 4/2002 | Ryan |
| 6,404,925 B1 | 6/2002 | Foote et al. |
| 6,438,275 B1 | 8/2002 | Martins et al. |
| 6,539,395 B1 | 3/2003 | Gjerdingen et al. |
| 6,711,293 B1 | 3/2004 | Lowe |
| 6,774,917 B1 | 8/2004 | Foote et al. |
| 6,785,815 B1 | 8/2004 | Serret-Avila et al. |
| 6,937,766 B1 | 8/2005 | Wilf et al. |
| 6,975,746 B2 | 12/2005 | Davis et al. |
| 6,975,755 B1 | 12/2005 | Baumberg |
| 7,043,019 B2 | 5/2006 | Tehranchi et al. |
| 7,055,169 B2 | 5/2006 | Delpuch et al. |
| 7,167,574 B2 | 1/2007 | Kim |
| 7,177,470 B2 | 2/2007 | Jasinschi et al. |
| 7,185,201 B2 | 2/2007 | Rhoads et al. |
| 7,218,754 B2 | 5/2007 | Schumann et al. |
| 7,272,240 B2 | 9/2007 | Goldberg et al. |
| 7,298,930 B1 | 11/2007 | Erol et al. |
| 7,325,013 B2 | 1/2008 | Caruso |
| 7,421,376 B1 | 9/2008 | Caruso et al. |
| 7,650,361 B1 | 1/2010 | Wong |
| 8,099,508 B2 | 1/2012 | Mao et al. |
| 8,160,366 B2 | 4/2012 | Nakamura et al. |
| 8,200,021 B2 | 6/2012 | Iwamoto et al. |
| 8,234,350 B1 * | 7/2012 | Gu ................... H04N 21/8458 709/217 |
| 8,515,212 B1 | 8/2013 | Bengio et al. |
| 8,515,241 B2 | 8/2013 | Forsyth et al. |
| 8,607,283 B2 | 12/2013 | Civanlar et al. |
| 8,677,428 B2 | 3/2014 | Lewis et al. |
| 8,887,215 B2 | 11/2014 | Fisher |
| 8,943,215 B2 | 1/2015 | Patten et al. |
| 9,015,151 B1 | 4/2015 | Margulis et al. |
| 9,066,115 B1 | 6/2015 | Cherry et al. |
| 9,066,138 B1 | 6/2015 | Kraiman et al. |
| 9,084,030 B1 | 7/2015 | Nijim |
| 9,167,278 B2 | 10/2015 | Sinha et al. |
| 9,491,499 B2 | 11/2016 | Wagenaar et al. |
| 9,613,042 B1 | 4/2017 | Joseph et al. |
| 9,654,817 B2 | 5/2017 | Li et al. |
| 10,104,137 B2 | 10/2018 | Salamons |
| 10,148,716 B1 | 12/2018 | Joseph et al. |
| 10,785,508 B2 | 9/2020 | Haritaoglu et al. |
| 2002/0159641 A1 | 10/2002 | Whitney et al. |
| 2002/0178447 A1 | 11/2002 | Plotnick et al. |
| 2003/0005454 A1 | 1/2003 | Rodriguez et al. |
| 2003/0033347 A1 | 2/2003 | Bolle et al. |
| 2003/0045954 A1 | 3/2003 | Weare et al. |
| 2003/0151621 A1 | 8/2003 | McEvilly et al. |
| 2003/0195883 A1 | 10/2003 | Mojsilovic et al. |
| 2003/0229900 A1 | 12/2003 | Reisman |
| 2004/0022447 A1 | 2/2004 | Mukhopadhyay et al. |
| 2004/0085339 A1 | 5/2004 | Divakaran et al. |
| 2004/0221237 A1 | 11/2004 | Foote et al. |
| 2004/0260786 A1 | 12/2004 | Barile |
| 2005/0041159 A1 | 2/2005 | Nakamura et al. |
| 2005/0125368 A1 | 6/2005 | Akahori |
| 2005/0251532 A1 | 11/2005 | Radhakrishnan et al. |
| 2005/0262245 A1 | 11/2005 | Menon et al. |
| 2005/0278736 A1 | 12/2005 | Steelberg |
| 2005/0289347 A1 | 12/2005 | Ovadia |
| 2006/0029253 A1 | 2/2006 | Pace |
| 2006/0101060 A1 | 5/2006 | Li et al. |
| 2006/0111801 A1 | 5/2006 | Weare et al. |
| 2006/0271973 A1 | 11/2006 | Jerding et al. |
| 2006/0279628 A1 | 12/2006 | Fleming |
| 2006/0291690 A1 | 12/2006 | Roberts |
| 2007/0025606 A1 | 2/2007 | Gholap et al. |
| 2007/0128899 A1 | 6/2007 | Mayer |
| 2007/0143493 A1 | 6/2007 | Mullig et al. |
| 2007/0157231 A1 | 7/2007 | Eldering et al. |
| 2007/0180466 A1 | 8/2007 | Ando et al. |
| 2007/0217676 A1 | 9/2007 | Grauman et al. |
| 2007/0253594 A1 | 11/2007 | Lu et al. |
| 2007/0282898 A1 | 12/2007 | Stark et al. |
| 2008/0027931 A1 | 1/2008 | Lu et al. |
| 2008/0040807 A1 | 2/2008 | Lu et al. |
| 2008/0123976 A1 | 5/2008 | Coombs et al. |
| 2008/0166057 A1 | 7/2008 | Nakajima |
| 2008/0186413 A1 | 8/2008 | Someya et al. |
| 2008/0271080 A1 | 10/2008 | Gossweiler et al. |
| 2009/0074235 A1 | 3/2009 | Lahr et al. |
| 2009/0089838 A1 | 4/2009 | Pino, Jr. |
| 2009/0113512 A1 | 4/2009 | Collet et al. |
| 2009/0193473 A1 | 7/2009 | Moon et al. |
| 2009/0204901 A1 | 8/2009 | Dharmaji et al. |
| 2009/0324026 A1 | 12/2009 | Kletter |
| 2010/0138865 A1 | 6/2010 | Rai |
| 2010/0162330 A1 | 6/2010 | Herlein et al. |
| 2010/0299438 A1 | 11/2010 | Zimmerman et al. |
| 2011/0078551 A1 | 3/2011 | Zhang et al. |
| 2011/0191692 A1 | 7/2011 | Walsh et al. |
| 2011/0219035 A1 | 9/2011 | Korsunsky et al. |
| 2011/0314493 A1 | 12/2011 | Lemire et al. |
| 2012/0089910 A1 | 4/2012 | Cassidy |
| 2012/0159337 A1 | 6/2012 | Travilla et al. |
| 2012/0166289 A1 | 6/2012 | Gadoury |
| 2012/0216121 A1 | 8/2012 | Lin et al. |
| 2012/0240176 A1 | 9/2012 | Ma et al. |
| 2012/0275597 A1 | 11/2012 | Knox et al. |
| 2012/0278725 A1 | 11/2012 | Gordon et al. |
| 2013/0060911 A1 | 3/2013 | Nagaraj et al. |
| 2013/0163758 A1 | 6/2013 | Swaminathan et al. |
| 2013/0195204 A1 | 8/2013 | Reznik et al. |
| 2013/0219178 A1 | 8/2013 | Xiques |
| 2013/0219425 A1 | 8/2013 | Swartz |
| 2013/0227074 A1 | 8/2013 | Odlund |
| 2013/0291002 A1 | 10/2013 | Rothschild et al. |
| 2013/0311780 A1 | 11/2013 | Besehanic |
| 2014/0029922 A1 | 1/2014 | Goldfeder et al. |
| 2014/0095890 A1 | 4/2014 | Mangalore et al. |
| 2014/0115060 A1 | 4/2014 | Kim et al. |

(56) References Cited

U.S. PATENT DOCUMENTS

| | | |
|---|---|---|
| 2014/0136661 A1 | 5/2014 | Handa |
| 2014/0173660 A1 | 6/2014 | Correa et al. |
| 2014/0176299 A1 | 6/2014 | Kumar et al. |
| 2014/0181656 A1 | 6/2014 | Kumar et al. |
| 2014/0201334 A1 | 7/2014 | Wang et al. |
| 2014/0259051 A1 | 9/2014 | Strein et al. |
| 2014/0280781 A1 | 9/2014 | Gregotski |
| 2014/0282772 A1* | 9/2014 | Chen ................ H04N 21/42201 725/97 |
| 2014/0337904 A1 | 11/2014 | Panje et al. |
| 2015/0058709 A1 | 2/2015 | Zaletel |
| 2015/0074232 A1 | 3/2015 | Phillips et al. |
| 2015/0113021 A1 | 4/2015 | Martin |
| 2015/0172342 A1 | 6/2015 | Yin |
| 2015/0208103 A1 | 7/2015 | Guntur et al. |
| 2015/0312299 A1 | 10/2015 | Chen |
| 2015/0346832 A1 | 12/2015 | Cole et al. |
| 2015/0365622 A1 | 12/2015 | Ushiyama |
| 2015/0365725 A1 | 12/2015 | Belyaev et al. |
| 2015/0382042 A1 | 12/2015 | Wagenaar et al. |
| 2016/0064400 A1 | 3/2016 | Kurokawa |
| 2016/0065946 A1 | 3/2016 | Cole et al. |
| 2016/0080470 A1 | 3/2016 | Shanson |
| 2016/0080810 A1 | 3/2016 | Dutta et al. |
| 2016/0127260 A1 | 5/2016 | Gordon |
| 2016/0127440 A1 | 5/2016 | Gordon |
| 2016/0134910 A1 | 5/2016 | Davis et al. |
| 2016/0149699 A1 | 5/2016 | Gauda |
| 2016/0173961 A1 | 6/2016 | Coan et al. |
| 2016/0198202 A1* | 7/2016 | Van Brandenburg ....................... H04N 21/4405 725/31 |
| 2016/0224799 A1 | 8/2016 | Uzun et al. |
| 2016/0227228 A1 | 8/2016 | Pomeroy et al. |
| 2016/0227279 A1 | 8/2016 | Fang et al. |
| 2016/0316233 A1 | 10/2016 | Ghadi et al. |
| 2016/0328396 A1 | 10/2016 | Rajapakse |
| 2016/0337704 A1 | 11/2016 | Binder et al. |
| 2017/0064400 A1 | 3/2017 | Riegel et al. |
| 2017/0070758 A1 | 3/2017 | Phillips et al. |
| 2017/0085933 A1 | 3/2017 | Czeck, Jr. et al. |
| 2017/0150190 A1 | 5/2017 | Tarbox et al. |
| 2017/0171580 A1 | 6/2017 | Hirsch et al. |
| 2017/0280181 A1 | 9/2017 | Ramaley |
| 2017/0302753 A1 | 10/2017 | Larumbe et al. |
| 2017/0308681 A1 | 10/2017 | Gould et al. |
| 2017/0353516 A1 | 12/2017 | Gordon |
| 2018/0063594 A1 | 3/2018 | Alexander et al. |
| 2018/0139507 A1 | 5/2018 | Toksoz et al. |

FOREIGN PATENT DOCUMENTS

| | | |
|---|---|---|
| CN | 101589617 A | 11/2009 |
| CN | 101689184 A | 3/2010 |
| CN | 103155571 A | 6/2013 |
| CN | 103491457 A | 1/2014 |
| JP | 3916025 B2 | 5/2007 |
| JP | 4150951 B2 | 9/2008 |
| WO | 2006122320 A2 | 11/2006 |
| WO | 2007148290 A2 | 12/2007 |
| WO | 2015148513 A1 | 10/2015 |

OTHER PUBLICATIONS

K. Mihcak and R. Venkatesan, "Blind Image Watermarking Via Derivation and Quantization of Robust Semi-3lobal Statistics", in IEEE International Conference on Acoustics, Speech and Signal Processing, 2002, (4 pages).

A. Andoni and P. Indyk, "Near-Optimal Hashing Algorithms for Approximate Nearest Neighbor in High Dimensions", n Proceedings of the Symposium on Foundations of Computer Science, Jan. 2006, 10 pages.

A. Joly, 0. Buisson and C. Frelicot, "Content-based Copy Retrieval using Distortion-based Probabilistic Similarity Search", IEEE Transactions on Multimedia, vol. 9, No. 2, p. 1-14, Feb. 2007.

J. Matas, 0. Chum, M. Urban, T. Pajdla, "Robust Wide Baseline Stereo from Maximally Stable Extremal Regions", in British Machine Vision Conference., 2002, pp. 384-393.

K. Mikolajczyk and C. Schmid, "Indexing based on scale invariant interest points", in Proc. ICCV, 2001, 7 pages.

Lindeberg, "Feature Detection with Automatic Scale Selection", International Journal of Computer Vision, vol. 30, No. 2, 1998, pp. 1-51.

International Search Report for PCT Patent Application No. PCT/US2017/032015 dated Aug. 4, 2017, 11 pages.

Chinese Patent Application No. 201780011326.6, Office Action dated Mar. 9, 2020, 6 pages.

Chinese Patent Application No. 201780011328.5, Office Action dated Mar. 9, 2020, 8 pages.

Chinese Patent Application No. 201780011326.6, Office Action dated Aug. 14, 2020, 7 pages.

Chinese Patent Application No. 201780011291.6, Office Action dated Sep. 29, 2021, 22 pages.

Partial European search report for European Patent Application No. 22174193.7, dated Sep. 9, 2022, 16 pages.

\* cited by examiner

```
#EXTM3U
#EXT-X-STREAM-INF:PROGRAM-ID=1,BANDWIDTH=1326000
http://12.34.56.789/server/play/directory/1326000/prog.m3u8
#EXT-X-STREAM-INF:PROGRAM-ID=1,BANDWIDTH=826000
http://12.34.56.789/server/play/directory/826000/prog.m3u8
#EXT-X-STREAM-INF:PROGRAM-ID=1,BANDWIDTH=1926000
http://12.34.56.789/server/play/directory/1926000/prog.m3u8
#EXT-X-STREAM-INF:PROGRAM-ID=1,BANDWIDTH=526000
http://12.34.56.789/server/play/directory/526000/prog.m3u8
```

FIG. 3

```
#EXTM3U
#EXT-X-TARGETDURATION:10
#EXT-X-VERSION:5
#EXT-X-MEDIA-SEQUENCE:1
#EXT-X-KEY:METHOD=SAMPLE-AES,URI="http://www.server.com/keys/ckey/kuxeFdrW8knwGPJ7zDIJ6Q==?anvack=nbcu_n
bcd_watchvod_ios_qa_c23d2809ee27249f2a757537da68d17d",IV=0xE0F48617C65F9D00ACC4B47D0EDE94B5
#EXTINF:12.512,
http://www.videolocation.com/2288/15/04/24/2861607/227C1D636AE412B0A9CD90ECB9B899BD6A7631282DBF7E-1.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x24BCA9ACCEFA864BFEC75CBED36D47C8
#EXTINF:12.512,
http://www.videolocation.com/2288/15/04/24/2861607/227C1D636AE412B0A9CD90ECB9B899BD6A7631282DBF7E-2.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x6C29CA3D305C63ACEBB7A06EBE3573F7
#EXTINF:12.513,
http://www.videolocation.com/2288/15/04/24/2861607/227C1D636AE412B0A9CD90ECB9B899BD6A7631282DBF7E-3.ts
#EXT-X-KEY:METHOD=SAMPLE-AES,URI="http://www.server.com/keys/ckeys/kuxeFdrW8knwGPJ7zDIJ6Q==?anvack=nbcu_nbcd_wa
tchvod_ios_qa_c23d2809ee27249f2a757537da68d17d",IV=0xC8BDB892FDE40BD0C167C3F10B5D8699
#EXTINF:12.512,
http://www.videolocation.com/2288/15/04/24/2861607/227C1D636AE412B0A9CD90ECB9B899BD6A7631282DBF7E-4.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x3F9FCC1E55D85CFE32C18BA73992181D
#EXTINF:12.513,
http://www.videolocation.com/2288/15/04/24/2861607/227C1D636AE412B0A9CD90ECB9B899BD6A7631282DBF7E-5.ts
```

FIG. 4

METHOD AND APPARATUS FOR A VIRTUAL ONLINE VIDEO CHANNEL

CROSS-REFERENCE TO RELATED APPLICATIONS

This continuation application claims priority to U.S. patent application Ser. No. 15/590,996 filed on May 9, 2017 and titled Method and Apparatus for a Virtual Online Video Channel, which claims the benefit of U.S. Provisional Application No. 62/334,236, filed May 10, 2016 and titled Method and Apparatus for a Virtual Online Video Channel. The entire contents of both applications are incorporated herein by reference.

BACKGROUND

The subject matter disclosed herein relates to a method of providing a virtual linear video channel for streaming video. More specifically, a method and apparatus for providing multiple streaming linear video channels from existing video channels and previously recorded video is disclosed.

Video streaming allows video content to be delivered to a video player via the internet. The video content is a video signal generated by a content provided for distribution to video consumers. The video signal may be provided in an uncompressed file format, such as a serial digital interface (SDI) format, or in a compressed format, such as a Moving Picture Experts Group (MPEG) file format or Transport Stream (TS) file format. The video signal is sent to an encoder which converts the file into a live streaming signal. The live streaming signal is preferably a segmented data stream that may be transmitted using standard Hypertext Transport Protocol (HTTP) over the internet. The live streaming signal may include multiple streams, where each stream may have a different data rate and/or different resolution.

Two common formats for the live streaming signal include HTTP Live Streaming (HLS) implemented by Apple® and MPEG-Dynamic Adaptive bitrate Streaming over HTTP (MPEG-DASH) implemented, for example, by web browsers such as Chrome®, Microsoft Edge®, and Firefox®. In addition to the segmented data stream, the encoder generates a manifest file. The manifest file contains information for a video player to play the segmented data stream such as the data rate and resolution of each stream and a playlist providing an address from which the video content may be retrieved. Historically, the encoder has generated a single manifest file for each encoded video signal, where the manifest file is distributed along with the streaming signal.

The live streaming signal and the manifest file are stored in one or more Content Delivery Networks (CDN). Each CDN includes a number of edge servers which store the streaming signal and manifest file until requested by a video player. When the streaming signal is provided to multiple CDNs, the CDNs may be in different geographic locations, such as the West Coast, East Coast, or Midwest. Each video player may select a CDN based, among other things, on its geographic proximity in order to reduce transmission latencies.

The video player may be any suitable electronic device to receive the streaming signal such as a desktop computer, a television, a laptop computer, a tablet, or a mobile phone. A user initiates a request to view desired video content on the video player. The video player includes video management software executing on the video player which has knowledge of the address of the CDN and which may provide a list of video content stored on the CDN to the user. After the user has selected a desired video, the video player, in turn, requests that the video content be transmitted from the CDN.

As is further known to those skilled in the art, broadcast operators of live streaming video channels typically utilize a content provider such as an automation playout system that transmits the video signal, and an encoder for each live streaming video channel. The cost of the equipment for providing a single live streaming video channel is significant.

However, the demand for new channels and varied content is rapidly growing. Viewers expect channels with video lineups tailored to their preferences. Further, the library of stored content continues to grow, such that some viewers opt for on-demand services only rather than live streaming content. Although the viewer may need to wait for a time period before the newest content is available via an on-demand service, the viewer elects to wait rather than pay for live channels that include content of which the viewer is only interested in a portion.

Thus, it would be desirable to provide a live channel wherein the content is tailored to an individual user such that users subscribe to the live channel. It would also be desirable to provide the additional live channel without requiring the additional expense of an additional content provider and encoder dedicated for the new channel.

BRIEF DESCRIPTION

The subject matter disclosed herein describes an apparatus and method for providing a virtual online linear video channel. The virtual online linear video channel is generated without requiring a dedicated content provider and encoder for the channel. A schedule server stores a schedule for the virtual online linear video channel, and the schedule may include one or more of live streaming video content, stored video content, and advertising. A video player establishes communication with a manifest server and requests playback of the video channel. The manifest server generates a per-user manifest file corresponding to the schedule of the virtual online linear video channel and delivers the per-user manifest file to the video player. The video player may then retrieve the desired video content from the content delivery network to produce the virtual online linear video channel.

According to one embodiment of the disclosure, a method for playback of a virtual online linear video channel is disclosed. A schedule for the virtual online linear video channel is generated, where the virtual online linear video channel includes multiple video sources. Each of the video sources is selected to distribute a video stream for at least a portion of the schedule. A manifest file is generated with a manifest server. The manifest file corresponds to the schedule for the virtual online linear video channel and identifies the selected video source from which the video stream is distributed at each portion of the schedule. A request to play the virtual online linear video channel is received from a video player, and the manifest file is transmitted to the video player.

According to other aspects of the disclosure, the multiple video sources may be selected from a live video stream, a video library, and an ad server. The multiple video sources may include a first live video stream and a second live video stream, where each of the first and second live video streams is output from a separate encoder.

According to another aspect of the disclosure, a connection is established between the manifest server and the video player, and a session identifier identifies the connection. A per-user manifest file may be generated in the manifest server, where the per-user manifest file is generated as a function of the manifest file and the session identifier. One of the video sources may be an ad server. At least one advertisement may be selected from the ad server as a function of the session identifier and inserted in the schedule for the virtual online linear video channel.

According to still another aspect of the disclosure, generating the schedule for the virtual online linear video channel may include the operations of displaying on an interface a list of the plurality of video sources available for inclusion in the schedule, receiving an indication of at least two different video sources and a corresponding time for inclusion in the schedule, and storing the schedule in a channel scheduler. A provider of at least one of the plurality of video sources may enter the indication of the at least two different video sources and the corresponding time on the interface.

According to another embodiment of the disclosure, a system for providing a virtual online linear video channel is disclosed. The system includes a channel scheduler and a manifest server. The channel scheduler is operative to receive a plurality of selections from a user interface, generate a schedule for a video channel corresponding to the plurality of selections, and store the schedule for the video channel. Each selection from the user interface identifies a video source and a time for receiving the video source, and at least two video sources are selected. The manifest server is operative to receive a request to play the video channel from a video player, obtain the schedule for the video channel from the schedule server, generate a manifest file corresponding to the schedule, and deliver the manifest file to the video player.

According to yet other aspects of the disclosure, the manifest server is further operative to establish a connection with the video player, where a session identifier identifies the connection. A per-user manifest file may be generated as a function of the manifest file and the session identifier, and the per-user manifest file is delivered to the video player. The system may also include an ad server operative to store a plurality of advertisements, receive a selection of advertisements stored in the ad server as a function of the session identifier, and transmit the advertisement to an address for playback. The manifest server may insert the address of the advertisement in the manifest file for playback on the video player. Optionally, the channel scheduler may define multiple time slots for advertisements and the ad server selects each of the at least one advertisement for insertion in the time slot.

According to still other aspects of the disclosure, the system may include a packager in communication with the manifest server and an ad server. The packager is operative to read a playlist from the manifest file on the manifest server, identify an entry in the playlist corresponding to an ad time slot, and retrieve an advertisement stored in an ad server for playback during the identified ad time slot. The packager may also be operative to store the advertisement at an address, and the manifest server may also be operative to store the address in the entry in the playlist prior to the video player retrieving the advertisement from the address.

According to yet another embodiment of the disclosure, a method for playback of a virtual online linear video channel is disclosed. A video channel is selected for playback on a video player, and an indication of the selected video channel is transmitted to a manifest server from the video player. The video player receives a manifest file from the manifest server, where the manifest file is generated by the manifest server to correspond to a schedule of the selected video channel. The schedule for the video channel identifies multiple video sources and each of the video sources is distributed on the video channel for at least a portion of the schedule. The manifest file identifies one of the video sources from which a video stream will be provided to the video player for each portion of the schedule.

These and other objects, advantages, and features of the disclosure will become apparent to those skilled in the art from the detailed description and the accompanying drawings. It should be understood, however, that the detailed description and accompanying drawings, while indicating preferred embodiments of the present disclosure, are given by way of illustration and not of limitation. Many changes and modifications may be made within the scope of the present disclosure without departing from the spirit thereof, and the disclosure includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which:

FIG. 3 is a segment of a manifest file describing the bandwidths of the available streams for the streaming video content and the location of each stream;

FIG. 4 is a segment of a manifest file including a portion of a playlist where the video content is encrypted;

Figure 1:
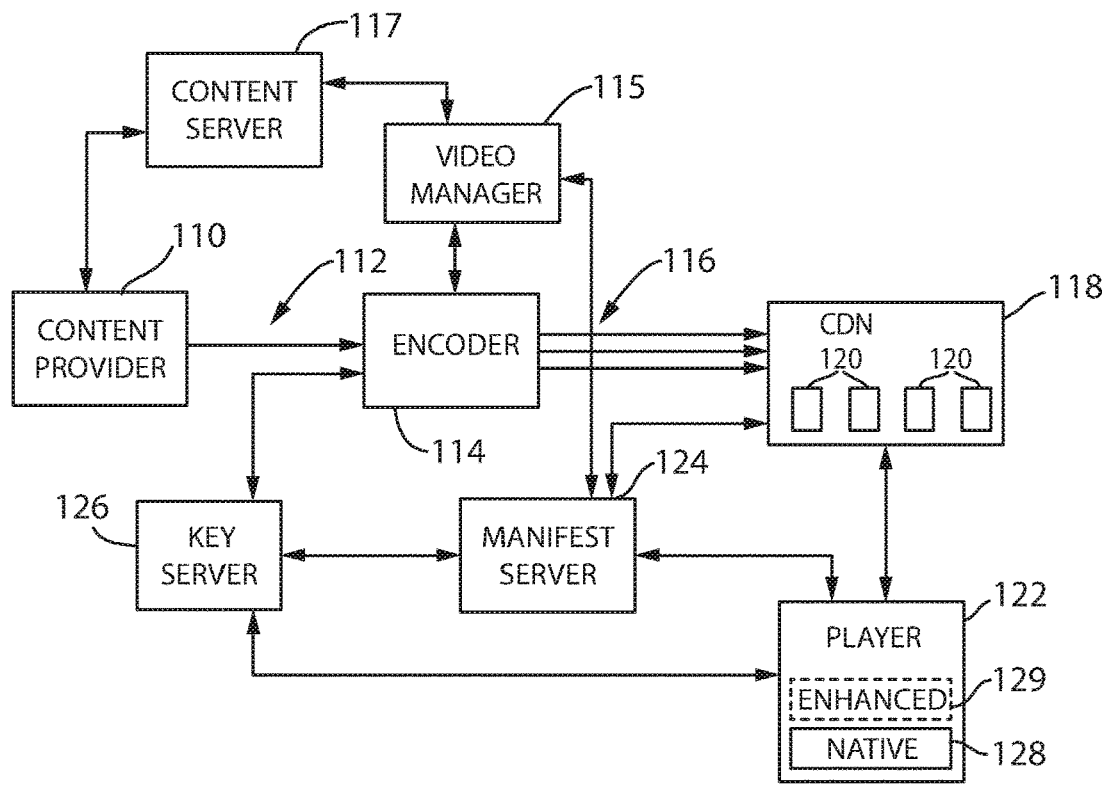
FIG. 1 is a block diagram representation of an environment for virtual online linear video channel generation and playback.

In describing the preferred embodiments of the disclosure which are illustrated in the drawings, specific terminology will be resorted to for the sake of clarity. However, it is not intended that the disclosure be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Turning initially to FIG. 1, one environment for virtual online linear video channel generation and playback is illustrated. A content provider 110 generates a video signal 112 to be distributed to video consumers. The video signal may be provided in an uncompressed file format, such as a SDI format, or in a compressed format, such as an MPEG or TS file format. The video signal 112 is sent to an encoder 114 which converts the file into a live streaming signal 116. The live streaming signal 116 is preferably a segmented data stream that may be transmitted using standard HTTP or HTTPS protocol over the internet. The live streaming signal 116 may include multiple streams, where each stream may have a different data rate and/or different resolution. The format of the live streaming signal may be, but is not limited to, HLS or MPEG-DASH. Still other protocols such as HTTP Dynamic Streaming (HDS) from Adobe® or Microsoft® Smooth Streaming and the like may be used without deviating from the scope of the disclosure.

In addition to the segmented data stream, the encoder generates a manifest file.

The manifest file contains information for a video player 122 to play the segmented data stream such as the data rate and resolution of each stream and a playlist providing an address from which the video content may be retrieved. The encoder 114 generates a single manifest file for each encoded video signal, where the manifest file is distributed along with the streaming signal 116 and stored on a CDN 118. It is noted that the "single" manifest file refers to a common or identical manifest file for each encoded signal. The manifest file may be comprised of multiple data files stored on the CDN where each data file contains information for a portion of the data required to playback the streaming signal. Further, for live streaming video, the manifest file may be updated and retransmitted at a periodic interval as new content is added from the live event. Although multiple files are used, the content of the manifest file generated by the encoder 114 for delivery to each video player 122 is the same. Each CDN 118 includes a number of edge servers 120 which store the encoded video signal 116 and manifest file until playback of the video content is requested by a video player 122. Although the embodiment illustrated in FIG. 1 shows a single CDN 118, it is contemplated that the encoded video signal 116 may be stored on multiple CDNs 118. The manifest file may include an address of each CDN such that playback may occur from any of the CDNs 118.

As further shown in FIG. 1, the illustrated environment includes a manifest server 124. The manifest server 124 is used to provide a unique manifest file, also referred to herein as a per-user manifest file, to each video player 122 for each requested video content. Each video player 122 includes a native video player module 128 which provides an interface to a user and which manages video playback on the device 122. Some video players 122 may further include an enhanced video player module 129, illustrated as an optional module in FIG. 1. The enhanced video player module 129 may be a plug-in or other software module executing on the video player 122 that either complements (i.e., adds additional capabilities) or replaces (i.e., adds additional capabilities and incorporates the video interface and playback capabilities) the native video player module 128. As will be discussed in more detail below, when a user 125 requests video content for playback on the video device 122, the native or enhanced video player module 129 communicates with a manifest server 124 rather than the CDN 118 to obtain the manifest files for video playback. The manifest server 124 manages the retrieval and delivery of the manifest file generated by the encoder 114 to provide the unique manifest file to each video player 122.

Figure 2:
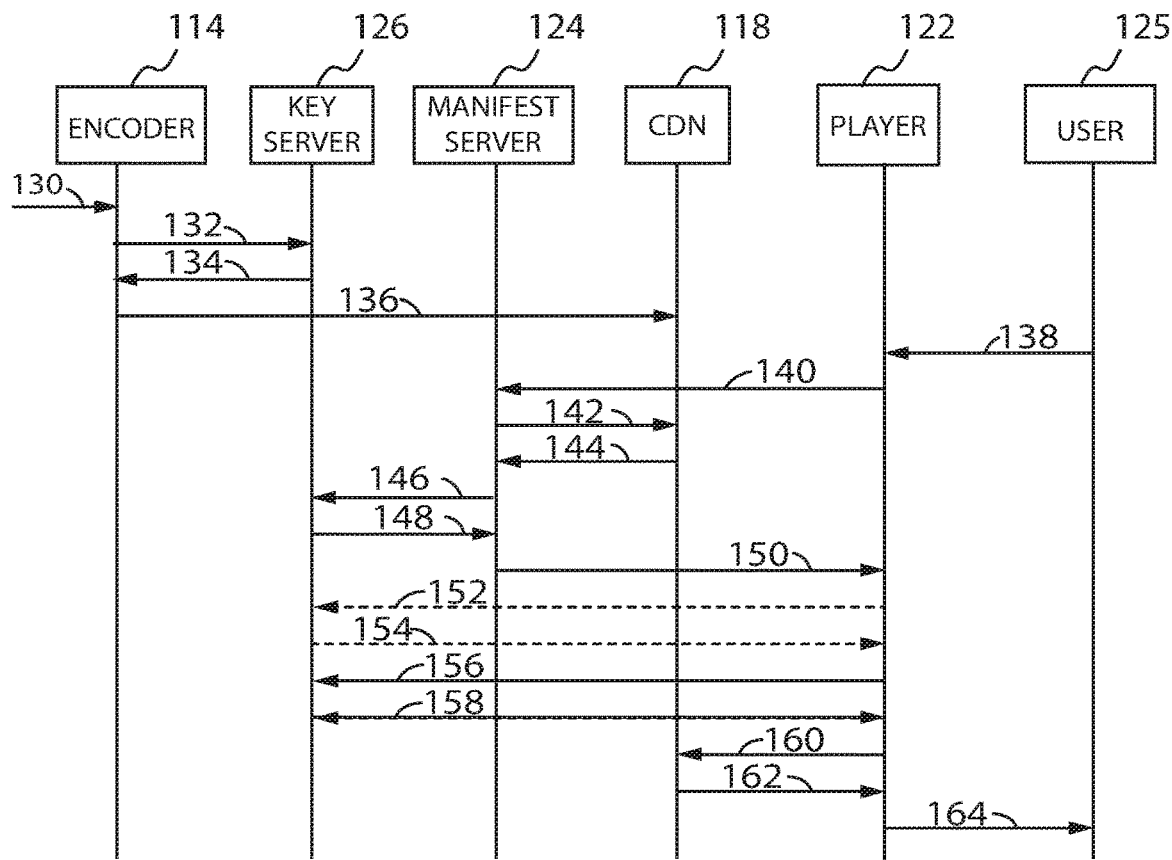
FIG. 2 is a flow diagram illustrating per-user video manifest generation and playback.

Turning next to FIG. 2, the operations performed to create, deliver, and playback video content according to a per-user manifest file are illustrated. At block 130, the encoder 114 receives the initial video signal 112. It is contemplated that this video signal 112 may be a pre-recorded signal, such as an episode of a television show or a movie, or the video signal 112 may be a live stream, for example, of a sporting event, concert, or news feed. The encoder 114 converts the original video signal into a live streaming signal 116 suitable for delivery via HTTP or HTTPS. One operation in converting the video signal is to divide the video signal into segments. The segments may be, for example, 10 seconds in length. Optionally, other segment lengths, for example, from 1 second up to 10 seconds may be selected. The length of the video segment must be less than the maximum payload for an HTTP data packet.

After converting the video signal 112 into segments, the encoder 114 encrypts the video signals 112 to prevent unauthorized viewing of the video content. At block 132, the encoder 114 establishes communication with a key server 126 and requests a key to use for encrypting the segmented video signal 112. The key server 126 returns a key to the encoder 114 as shown in block 134. The key used to encrypt the segmented video signal 112 will be referred to herein as the content encryption key. The encoder 114 may use any suitable encryption protocol, such as the Advanced Encryption Standard (AES), to encrypt the segmented video signal using the content encryption key. The location of the key server and the content encryption key used to encrypt the segmented video signal is included in a manifest file. The manifest file and the encrypted video signal are then transmitted to the CDN 118 for storage in one of the edge servers 120, as shown in block 136.

At block 138, a user 125 then requests playback of a desired video segment on the video player 122. The video player 122 may be any suitable electronic device to receive the streaming signal 116 such as a desktop computer, a television, a laptop computer, a tablet, Wi-Fi enabled device connected to a video screen, or a mobile phone. The video player 122 requests a manifest file from the manifest server 124 in order to retrieve the information necessary to play the requested video content. With reference also to FIGS. 3 and 4, segments of manifest files are illustrated that demonstrate a portion of the content that may be available in a manifest file. The manifest file is a text file and the particular content on each line of the text file is identified by the directive at the start of the line. The directive, for example, may identify specific streams in the streaming signal 116 where each stream has a different bandwidth. The location of a playlist for each of the streams is also included in the manifest file. Each line of a playlist may begin with the location of the key server to decrypt the video segment, identify a particular video segment of the desired video signal, and provide the location of the video segment in the CDN 118. The manifest file may include any information corresponding to the video stream, such as metadata information for the video stream.

When the video player 122 requests the manifest file from the manifest server 124 a connection is established between the devices. A session identifier is also generated to identify the connection. The session identifier may be generated by the video player 122 or the manifest server 124. For purposes of illustration, it will be assumed that the session identifier is generated by the video player 122. The session identifier is transmitted to the manifest server 124 by the video player 122 when requesting a manifest file. If the enhanced video player module 129 is present on the video player 122, the enhanced video player module 129 may provide an indication to the manifest server 124 of its presence, for example, via a unique data packet format or an identifier set in the header or payload of the request for a manifest file. The manifest server 124 then requests the manifest file from the CDN 118 at block 142. At block 144, the CDN 118 returns the manifest file to the manifest server 124.

Because the manifest server 124 has established a connection with video player 122, it may customize the manifest file prior to returning the manifest file to the video player 122 and provide a unique manifest file to each video player 122. Without the manifest server 124, the video player 122 retrieves the manifest file directly from the CDN 118 and the content of the manifest file is the same for all users. However, because the manifest server 124 is providing a unique manifest file to each player, the manifest file may include identifying information of the video player 122, the user 125 of the video player, or a combination thereof. Further, the manifest file may be modified to include content specific for the user 125. Consequently, it may be desirable to encrypt the manifest file prior to transmitting it to the video player 122.

The manifest server 124 may be configured to generate an encryption key for each manifest file. The encryption key is generated as a function of the unique session identifier generated by the video player 122 when it requested the desired video content. Optionally, the encryption key may also be generated as a function of the requested video content. As a result, each encryption key is unique to a specific session with a particular video player, resulting in a one-time use unique encryption key. The one-time use unique encryption key will be referred to herein as the manifest encryption key. At block 146, the manifest server 124 transmits the manifest encryption key to the key server 126, and at block 148, the key server 126 acknowledges receipt of the manifest encryption key.

Optionally, the key server 126 may be configured to generate the manifest encryption key. At block 146, the manifest server 124 transmits the session identifier and an identifier corresponding to the desired video content to the key server rather than transferring the manifest encryption key. The key server 126 may then generate the manifest encryption key and, at block 148, return the manifest encryption key to the manifest server 124. After generating or obtaining the manifest encryption key, the manifest server 124 encrypts the manifest file prior to transmitting the manifest file to the video player 122. The manifest server 124 then transmits the encrypted manifest file to the video player 122, as shown at block 150.

Optionally, if the manifest server 124 has received an indication of the presence of the enhanced video player module 129, the manifest file may be encrypted without inserting the location of an encryption key. The enhanced video player module 129 may be configured to generate a duplicate encryption key on the video player module as a function of the session identifier and, therefore, transmission of the key is not required. After retrieval and editing, if necessary, of the manifest file, the manifest server 124 encrypts the manifest file with the manifest encryption key prior to transmitting the manifest file to the video player 122. The manifest server 124 then transmits the encrypted manifest file to the video player 122, as shown at block 150.

If, however, the video player does not include an enhanced video player module 129 from the provider of the manifest server 124, the manifest server 124 may include a path to the key server 126, similar to that shown in FIG. 4, and the video player 122 requests the manifest encryption key from the key server 126 as shown in block 152. At block 154, the key server 126 returns the manifest encryption key to the video player 122, and the video player 122 decrypts the manifest file.

In some embodiments, the manifest file may remain unencrypted. When the manifest file is to remain unencrypted, the manifest server 124 may still generate a unique manifest file for the session with the video player 122. The blocks in FIG. 2 process as discussed above from block 130 to block 144. However, rather than encoding the manifest file, the manifest server 124 skips blocks 146 and 148, transmitting an unencrypted manifest file to the video player at block 150. The video player 122 reads the manifest file and determines that the video content has been encrypted and, therefore, must still be decrypted.

Having decrypted the manifest file, either directly on the video player 122 with an enhanced video player module 129 or by requesting the manifest encryption key from the key server 126 and then utilizing the native video player module 128 to decode the manifest file, either the enhanced video player module 129 or the native video player module 128 next needs to decode the video content.

The video player module reads the location of the key server 126 for the content encryption key from the manifest file. It is contemplated that a single key server 126 may contain both the manifest encryption key and the content encryption key. Optionally, separate key servers 126 may be utilized for each of the encryption keys. The video player 122 requests the content encryption key from the key server 126 identified in the manifest file, as shown in block 156. At block 158, the key server 126 returns the content encryption key to the video player 122. The manifest file will have the address of the CDN 118 as containing the segmented video content. Therefore, the video player can then start retrieving the video content from the CDN. The video player 122 repeatedly requests the next segment in the playlist from the CDN 118 and the CDN returns the requested segment as shown by blocks 160 and 162. The native video player module 128 then decodes the content from the encrypted video segments and displays the requested video content to the user 125.

Figure 7:
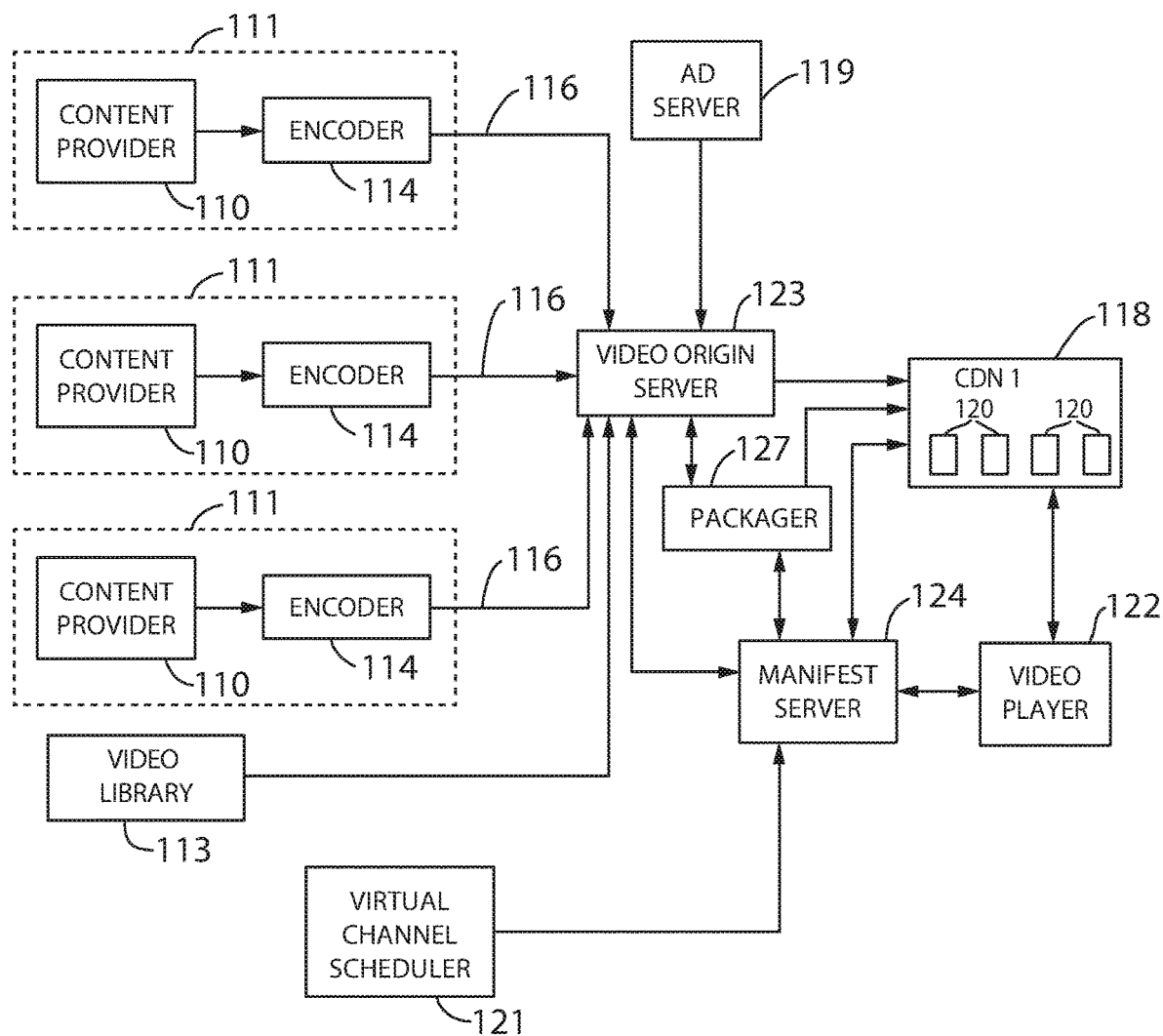
FIG. 7 is an environment operative to generate a virtual online linear video channel according to one embodiment of the disclosure.

Turning next to FIG. 7, a series of live streaming channels 111 are illustrated. Each of the live streaming channels includes a separate content provider 110 and encoder 114. It is contemplated that the content provider 110 may provide live events, such as a sporting event, a concert, or the like as well as prerecorded content, such as a television show or a movie. The content is, however, provided according to a predefined schedule for the live streaming channel. It is contemplated that each of the live streaming channels is owned by a single broadcast company. For example, the broadcast company may be NBC® and the live streaming channels may be a local NBC channel, MSNBC®, and NBC Sports®. Further, the broadcast company may own a video library 113 including, for example, movies, prior sporting events, earlier episodes of live programming, and the like. The video library 113 may be accessible via an on-demand service where viewers may select video content from the library 113 for viewing. In addition, an advertisement server 119 is provided on which advertisements may be stored for delivery to the CDN 118 and/or to the video player 122. For convenience, a video origin server 123 is shown. Each of the live streaming channels 111, the video library 113, and advertisements are available through the video origin server 123. The content of each may be stored on the CDN 118.

Optionally, the streaming video signals 116, on-demand content, and advertisements may be provided separately to the content delivery network 118.

As previously discussed, the broadcast company presently creates a schedule and a playlist for the content delivered by each content provider 110 to generate a live streaming channel 111. The content provider 110 outputs the video signal to the encoder 114, which, in turn, outputs a segmented streaming video signal 116 suitable for delivery to and storage on the CDN 118. Presently, a viewer uses the video player 122 to access each live streaming channel 111 and watch the content presently being delivered on the channel.

The present disclosure allows the broadcast company to develop additional live streaming channels tailored to a viewer's interests without requiring an additional content provider 110 and encoder 114 for the channel. The additional live streaming channels are referred to herein as a virtual online linear video channel wherein the use of virtual indicates that the additional streaming channels do not require a content provider 110 and encoder 114 dedicated to each new channel. The use of linear indicates that the video channel transmits content according to a predefined schedule, where definition of the schedule is provided in more detail below. Transmitting content according to a predefined schedule is in contrast to on-demand content in which a user selects content from a playlist for playback at their desired time. The content on the virtual online linear channel will be available to all users at the same time and on a single channel similar to the other live streaming channels described above. Thus, the content on the virtual online linear video channel is streamed at a predefined time from one or more other live streams. Further, the broadcast company may develop premium virtual online linear video channels for which a viewer may pay an additional fee that omits all advertising.

Figure 8:
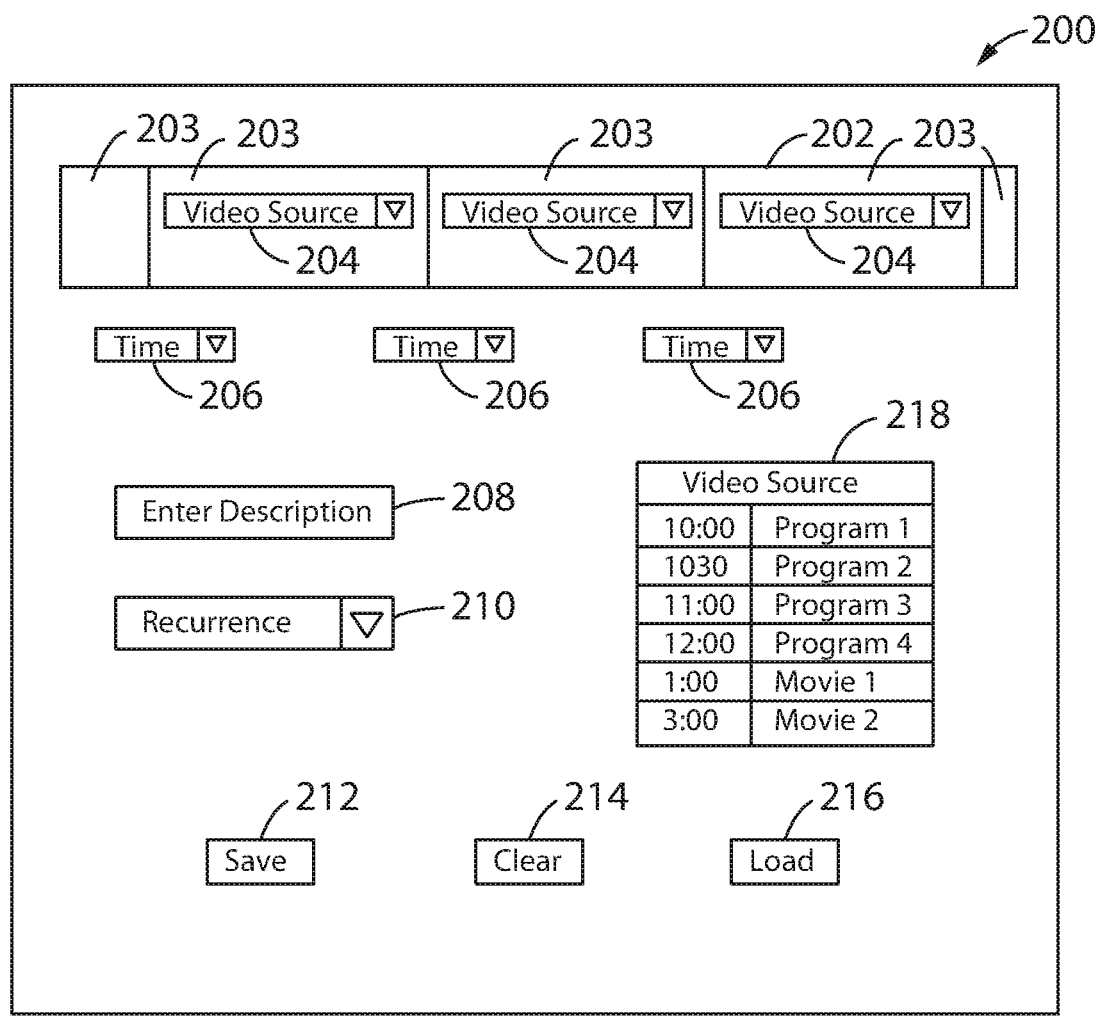
FIG. 8 is one embodiment of an interface for generating a schedule for the virtual online linear video channel.

A virtual channel scheduler 121 is provided that generates playlists for each of the virtual online linear video channels. According to one embodiment of the disclosure, the virtual channel scheduler 121 may be included on a server owned by the broadcast company. According to another embodiment of the disclosure, the virtual channel scheduler 121 may be provided on the cloud as a demand-based device, provided by either the broadcast company or a third party. The virtual channel scheduler 121 stores schedules of content for delivery. With reference also to FIG. 8, the virtual channel scheduler 121 provides an interface 200 for selecting video sources to be used in creating the virtual online linear video channel.

In the interface 200 illustrated in FIG. 8, a schedule bar 202 is presented with multiple slots 203. In each slot 203, a video source drop down menu 204 is provided from which a source of video content may be selected. Further the start/stop time for each slot 203 may similarly be selected via a time drop down menu 206. A title for the channel may be entered in the description 208 text box, and a recurrence of the channel may be selected via a recurrence drop down menu 210. For example, the schedule may be implemented once or may repeat, for example, on a daily or weekly basis. A preview window 218 may provide an existing schedule for each live video channel 111 to assist a user in selecting start/stop times and/or content for inclusion in the schedule for the virtual online channel. Once the schedule has been defined, a save button 212 allows the selected schedule to be stored in the virtual channel scheduler 121. Buttons 214, 216 are also provided to clear the schedule or to load an existing schedule. The interface 200 is described herein according to one embodiment. It is contemplated that various other arrangements of the interface 200 may be utilized without deviating from the claimed disclosure. The interface 200 may include various configurations of windows, text boxes, drop-down menus, buttons and the like as would be understood in the art to provide a user the ability to select video sources for inclusion in the virtual online video channel.

Figure 5:
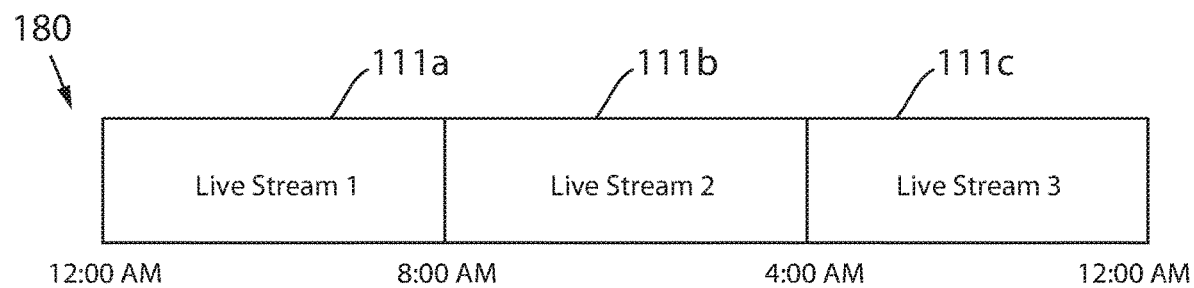
FIG. 5 is a schedule of multiple live streaming video channels arranged to generate a virtual online linear video channel according to one embodiment of the disclosure.
Figure 6:
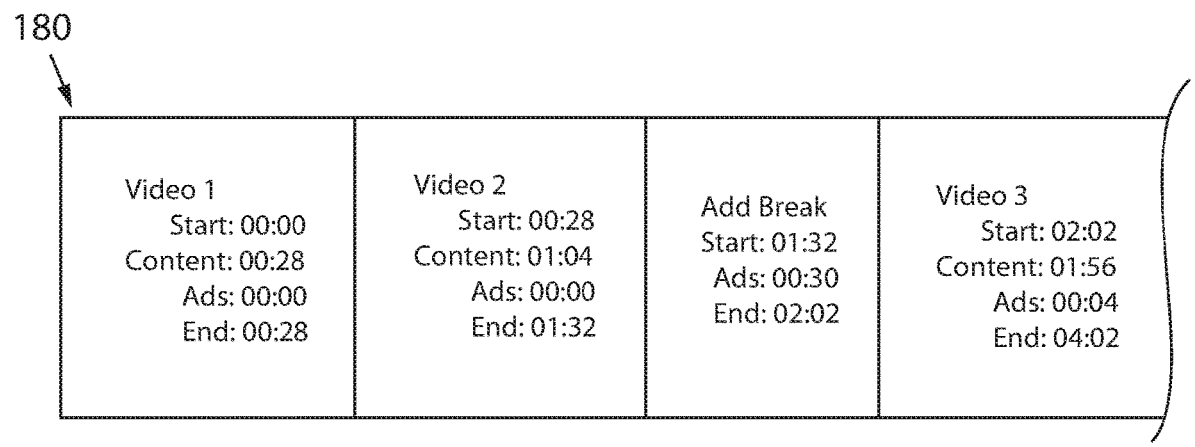
FIG. 6 is a schedule of stored video content arranged to generate a virtual online linear video channel according to one embodiment of the disclosure.

With reference, for example, to FIG. 5, a schedule 180 for a virtual online linear video channel may be created that includes video content from a first live stream channel 111a provided between midnight and eight o'clock in the morning, a second live stream channel 111b provided between eight o'clock in the morning and four o'clock in the afternoon, and a third live stream channel 111c provided between four o'clock in the afternoon and midnight. The schedule may repeat on a daily basis or may be uniquely defined for the next day. With reference also to FIG. 6, a schedule 180 for content from the video library 113 is illustrated. The schedule 180 includes a first video and a second video played back-to-back with no advertisements. Then a thirty minute advertisement, sometimes referred to as an infomercial, is shown. A third video follows that includes four minutes of advertising content delivered at the start, the end, or interspersed throughout the video content. The schedule 180 of content from the video library 113 may continue in a similar manner throughout the day.

Creation of the schedule may be performed by the broadcast company, by a third party, or even by a viewer. The virtual channel scheduler 121 may provide the interface 200 through which content may be scheduled for the virtual online video channel. The content may be selected from multiple video sources such as live video streams 111, the video library 113, or the ad server 119, and it is contemplated that the schedule will include at least two video sources, where the video sources may be, for example, different live video streams 111 or a live video stream 111 and the video library 113. The interface 200 may provide, for example, a list of content and a template schedule where the content may be dragged and dropped into the schedule.

The schedule may be created either by a broadcast company or by individual viewers. If the broadcast company is generating a schedule, the schedule may be determined based on market research, geographic location, and the like and is typically fixed over a period of time. If a third party or individual viewers are generating a schedule, the broadcast company may offer variable levels of flexibility according to a pricing schedule. At a top pricing tier, the third party or individual viewer may select any live stream channel or content from the video library for delivery according to their desired schedule. At one or more lower pricing tiers, the broadcast company may require a certain percentage of content be selected from the advertising server 119 according to the pricing tier. The broadcast company may, however, allow the user to identify, for example, a product category or company list from which advertisements will be played. Optionally, the broadcast company may restrict the video sources available for inclusion in the schedule based on the pricing tier as well. At a bottom tier, the broadcast company may select and insert advertisements into the schedule template and/or only allow users to select a portion of the live streaming videos 111 or video library 113 for insertion into the schedule for their virtual online video channel. Each of the schedules is stored on the virtual channel scheduler 121.

To access the virtual online linear video channel, a viewer requests the channel using the native video module 128 or enhanced video module 129 on the video player 122 in the same manner as requesting a live streaming channel 111.

Optionally, the online video channel may be restricted to a subscription service or to an individual viewer if it is a custom video channel. The viewer may be required to enter user identification to access the video channel. The enhanced video module 129 may be operative to receive and verify the credential information, provide the virtual online channel as an option in a playlist to the viewer, and transmit the selection of the virtual online channel and any credential information to the manifest server 124 to permit access to the virtual online channel.

The per-user manifest system discussed above is utilized to deliver the content of the virtual online linear channel to the viewer. As previously discussed, each of the live stream channels 111 generate video files and manifest files to be stored on the CDN 118 where a video player 122 may access the CDN 118 directly or via the manifest server 124 to retrieve the content for the live stream channel 111. If the online video channel includes a portion of the content of the live stream channel 111, the manifest server 124 inserts into a per-user manifest file the location on the CDN 118 at which the live stream content is stored. If the schedule indicates that advertisements are to be included, the manifest server 124 retrieves ad content from the ad server 119 and stores it on the CDN 118. The manifest server 124 also includes the location of the ad content on the CDN 118 in the manifest file such that the video player 122 may retrieve and play back the ad content. The packager 127 may work in combination with the manifest server 124 to retrieve ad content from the ad server 119 and store it in the CDN 118. The packager 127 allows for just in time delivery of content by reading the per-user manifest file from the manifest server 124. The packager 127 identifies entries in the playlist of the manifest file that correspond to an advertisement. The packager 127 retrieves content from an ad server 119 as required by the play list. The packager 127 may transfer the ad content from the ad server 119 to the CDN 118 as it is needed for playback on the video player 122. Optionally, the packager 127 may transfer the ad content from the ad server 119 to the manifest server 124 or to the packager 127 for subsequent delivery to the video player 122. The video player 122 retrieves the ad content from the address in the playlist of the manifest file. It is contemplated that the packager 127 alone or in combination with the manifest server 124 may edit the per user manifest file to identify the address at which the as content is stored for subsequent playback on the video player 122.

Similarly, the manifest server 124 and/or the packager 127 may deliver video content from the video library 113 on demand as it is required to fill a time slot in the schedule 180. It is contemplated that the packager 127 and the manifest server 124 may be implemented separately or together on a local server or on a cloud server providing scalability of service as required. By generating a per-user manifest file that includes a playlist as defined by the schedule for the virtual video channel, the content desired by the viewer may be provided in a continuous manner appearing to the viewer to be a live streaming channel.

Portions of the disclosed embodiment are described herein as being implemented on various physical devices, including, but not limited to the video player 122, the manifest server 124, the key server 126, the encoder 114, the edge server 120 within a CDN 118, the content server 117, the video manager 115, the video origin server 123, the packer 127, the ad server 119, and the virtual channel scheduler 121. It would be understood by one skilled in the art that these devices may include processing devices, such as a single microprocessor, multiple microprocessors, co-processors, application specific integrated circuits (ASICs), or other computing devices operating separately, in tandem, or a combination thereof. Further, each of these devices includes storage which may include transitory storage, non-transitory storage, or a combination thereof. The storage may include memory devices such as random access memory (RAM), read-only memory (ROM), solid state memory, and the like. The storage may further include devices configured to read removable storage medium such as CD-ROMs, DVDs, floppy disks, universal serial bus (USB) devices, memory cards, and the like. The processing devices may be configured to read and execute instructions stored in non-transitory storage to perform various operations in the methods described herein.

It should be understood that the disclosure is not limited in its application to the details of construction and arrangements of the components set forth herein. The disclosure is capable of other embodiments and of being practiced or carried out in various ways. Variations and modifications of the foregoing are within the scope of the present disclosure. It also being understood that the technology disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure.

What is claimed is:

1. A method for providing a virtual online linear video channel, comprising:

providing a user interface concurrently presenting a channel description field, one or more video source fields and one or more time slot fields, and a preview window;

receiving first user input specifying a description of the virtual online linear video channel via the channel description field, second and third user inputs identifying a live video stream and a prerecorded video signal respectively via the one or more video source fields, and fourth and fifth user inputs identifying start times for the live video stream, and the prerecorded video signal respectively via the one or more time slot fields, wherein the preview window presents first data identifying the live video stream, second data identifying the prerecorded video signal, and the start times for the live video stream and the prerecorded video signal;

receiving, at a server, a request to play the virtual online linear video channel from a video player;

establishing a connection between the server and the video player;

identifying a schedule for the virtual online linear video channel, wherein the schedule is associated with a geographic location of a plurality of geographic locations associated with the server, and wherein the schedule identifies a plurality of video sources comprising the live video stream and the prerecorded video signal, and the start times for the live video stream and the prerecorded video signal, and wherein the live video stream and the prerecorded video signal are encrypted using a content encryption key; and responsive to determining that a geographic location of the video player matches the geographic location associated with the schedule:

identifying at least one advertisement from a plurality of advertisements, the at least one advertisement corresponds to the plurality of video sources of the schedule of the virtual online linear video channel, and providing, using the connection, a manifest file to the video player, the manifest file corresponding to the schedule for the virtual online linear video channel and identifying a first location of the live video stream, a second location of the prerecorded video signal, a third location of the at least one advertisement, the live video stream, the prerecorded video signal and the at least one advertisement to be retrieved by the video player to produce the virtual online linear video channel, wherein the virtual online linear video channel is presented to a user of the video player.

2. The method of claim 1, wherein the plurality of video sources are selected from at least two of a live video stream, a video library, or an ad server.

3. The method of claim 1 further comprising:

generating the manifest file by the server, wherein the manifest file is a per-user manifest file that is generated based on an initial manifest file received from at least one content delivery network and a session identifier generated by the server, wherein the session identifier identifies the connection between the server and the video player.

4. The method of claim 3, wherein generating the manifest file further comprises:

selecting the at least one advertisement from the plurality of advertisements based on the session identifier; and inserting the third location of the at least one advertisement in the manifest file.

5. The method of claim 3 further comprising:

generating an encryption key based on the session identifier; and encrypting the manifest file using the encryption key prior to transmitting the manifest file to the video player.

6. The method of claim 1 further comprising:

generating the schedule for the virtual online video channel; and storing the schedule in a channel scheduler.

7. The method of claim 1, wherein each of the live video stream and the prerecorded video signal of the plurality of video sources is output from a separate encoder.

8. A system for providing a virtual online linear video channel, the system comprising:

a processor;

a memory which stores instructions which, when executed by the processor, cause the processor to:

provide a user interface concurrently presenting a channel description field, one or more video source fields and one or more time slot fields, and a preview window;

receive first user input specifying a description of the virtual online linear video channel via the channel description field, second and third user inputs identifying a live video stream and a prerecorded video signal respectively via the one or more video source fields, and fourth and fifth user inputs identifying start times for the live video stream, and the prerecorded video signal respectively via the one or more time slot fields, wherein the preview window presents first data identifying the live video stream, second data identifying the prerecorded video signal, and the start times for the live video stream and the prerecorded video signal;

receive, at a server, a request to play the virtual online linear video channel from a video player;

establish a connection between the server and the video player;

identify a schedule for the virtual online linear video channel, wherein the schedule is associated with a geographic location of a plurality of geographic locations associated with the server, and wherein the schedule identifies a plurality of video sources comprising the live video stream and the prerecorded video signal and the start times for the live video stream and the prerecorded video signal, and wherein the live video stream and the prerecorded video signal are encrypted using a content encryption key; and responsive to determining that a geographic location of the video player matches the geographic location associated with the schedule:

identify at least one advertisement from a plurality of advertisements, the at least one advertisement corresponds to the plurality of video sources of the schedule of the virtual online linear video channel, and provide, using the connection, a manifest file to the video player, the manifest file corresponding to the schedule for the virtual online linear video channel and identifying a first location of the live video stream, a second location of the prerecorded video signal, a third location of the at least one advertisement, the live video stream, the prerecorded video signal and the at least one advertisement to be retrieved by the video player to produce the virtual online linear video channel, wherein the virtual online linear video channel is presented to a user of the video player.

9. The system of claim 8, wherein the plurality of video sources are selected from at least two of a live video stream, a video library, or an ad server.

10. The system of claim 8, wherein the processor is further to:

generate the manifest file by the server, wherein the manifest file is a per-user manifest file that is generated based on an initial manifest file received from at least one content delivery network and a session identifier generated by the server, wherein the session identifier identifies the connection between the server and the video player.

11. The system of claim 10, wherein to generate the manifest file, the processor is further to:

select the at least one advertisement from the plurality of advertisements based on the session identifier; and insert a third address of the at least one advertisement in the manifest file.

12. The system of claim 10, wherein the processor is further to:

generate, by the server, an encryption key based on the session identifier; and encrypt the manifest file using the encryption key prior to transmitting the manifest file to the video player.

13. The system of claim 8, wherein the processor is further to:

generate the schedule for the virtual online video channel; and store the schedule in a channel scheduler.

14. The system of claim 13, wherein a provider of at least one of the plurality of video sources enters an indication of at least two different video sources and a corresponding time on the user interface.

15. A non-transitory computer readable medium encoding instructions that, in response to execution by a computing device, cause the computing device to perform operations for providing a virtual online linear video channel, the operations comprising:
- providing a user interface concurrently presenting a channel description field, one or more video source fields and one or more time slot fields, and a preview window;
- receiving first user input specifying a description of the virtual online linear video channel via the channel description field, second and third user inputs identifying a live video stream and a prerecorded video signal respectively via the one or more video source fields, and fourth and fifth user inputs identifying start times for the live video stream, and the prerecorded video signal respectively via the one or more time slot fields,
  - wherein the preview window presents first data identifying the live video stream, second data identifying the prerecorded video signal, and the start times for the live video stream and the prerecorded video signal;
- receiving, at a server, a request to play the virtual online linear video channel from a video player;
- establishing a connection between the server and the video player;
- identifying a schedule for the virtual online linear video channel, wherein the schedule is associated with a geographic location of a plurality of geographic locations associated with the server, and wherein the schedule identifies a plurality of video sources comprising the live video stream and the prerecorded video signal and the start times for the live video stream and the prerecorded video signal, and wherein the live video stream and the prerecorded video signal are encrypted using a content encryption key; and
- responsive to determining that a geographic location of the video player matches the geographic location associated with the schedule:
  - identifying at least one advertisement from a plurality of advertisements, the at least one advertisement corresponds to the plurality of video sources of the schedule of the virtual online linear video channel, and
  - providing, using the connection, a manifest file to the video player, the manifest file corresponding to the schedule for the virtual online linear video channel and identifying a first location of the live video stream, a second location of the prerecorded video signal, a third location of the at least one advertisement, the live video stream, the prerecorded video signal and the at least one advertisement to be retrieved by the video player to produce the virtual online linear video channel, wherein the virtual online linear video channel is presented to a user of the video player.

16. The non-transitory computer readable medium of claim 15, wherein the plurality of video sources are selected from at least two of a live video stream, a video library, or an ad server.

17. The non-transitory computer readable medium of claim 15, wherein the computing device is to perform further operations comprising:
- generating the manifest file by the server, wherein the manifest file is a per-user manifest file that is generated based on an initial manifest file received from at least one content delivery network and a session identifier generated by the server, wherein the session identifier identifies the connection between the server and the video player.

18. The non-transitory computer readable medium of claim 17, wherein to generate the manifest file, the computing device is to perform further operations comprising:
- selecting the at least one advertisement from the plurality of advertisements based on the session identifier; and
- inserting the third location of the at least one advertisement in the manifest file.

19. The non-transitory computer readable medium of claim 17, wherein the computing device is to perform further operations comprising:
- generating, by the server, an encryption key based on the session identifier; and
- encrypting the manifest file using the encryption key prior to transmitting the manifest file to the video player.

20. The non-transitory computer readable medium of claim 15, wherein each of the live video stream and the prerecorded video signal of the plurality of video sources is output from a separate encoder.

* * * * *